United States Patent
Garces et al.

(10) Patent No.: US 9,793,827 B2
(45) Date of Patent: Oct. 17, 2017

(54) POWER CONVERSION SYSTEM AND METHOD

(71) Applicant: GE ENERGY POWER CONVERSION TECHNOLOGY LIMITED, Warwickshire (GB)

(72) Inventors: Luis Jose Garces, Niskayuna, NY (US); Cyrus David Harbourt, Roanoke, VA (US); Richard S Zhang, Paris (FR); Allen Michael Ritter, Roanoke, VA (US); Rajib Datta, Tempe, AZ (US)

(73) Assignee: GE ENERGY POWER CONVERSION TECHNOLOGY LTD (GB)

( * ) Notice: Subject to any disclaimer, the term of this patent is extended or adjusted under 35 U.S.C. 154(b) by 739 days.

(21) Appl. No.: 14/205,459

(22) Filed: Mar. 12, 2014

(65) Prior Publication Data
US 2014/0265587 A1  Sep. 18, 2014

(30) Foreign Application Priority Data
Mar. 14, 2013 (CN) .......................... 2013 1 0081708

(51) Int. Cl.
  *H02J 1/00* (2006.01)
  *H02J 3/00* (2006.01)
  (Continued)

(52) U.S. Cl.
  CPC ........... *H02M 7/5387* (2013.01); *H02M 5/14* (2013.01); *H02M 7/487* (2013.01); *H02M 7/497* (2013.01);
  (Continued)

(58) Field of Classification Search
  CPC ...... H02M 7/5387; H02M 7/497; H02M 5/14; H02M 7/487; H02M 2001/0077; H02M 7/493; Y10T 307/549
  (Continued)

(56) References Cited

U.S. PATENT DOCUMENTS

| 3,477,010 A | 11/1969 | Ve Nard |
| 4,052,658 A | 10/1977 | Hucker |

(Continued)

FOREIGN PATENT DOCUMENTS

| CN | 101036276 A | 9/2007 |
| CN | 101442264 A | 5/2009 |

(Continued)

OTHER PUBLICATIONS

Barbosa et al., "Novel Control Strategy for Grid-Connected DC-AC Converters with Load Power Factor and MPPT Control", Federal University of Rio de Janeiro, Department of Electrical Engineering, Apr. 1998, 1-15 pages.

(Continued)

*Primary Examiner* — Richard Tan
(74) *Attorney, Agent, or Firm* — GE Global Patent Operation; Scott R. Stanley

(57) ABSTRACT

A power conversion system includes a first converter effectively connected in series to a second converter. Each converter has a plurality of output levels. A phase-shifted transformer is coupled to the converters. The phase-shifted transformer has a delta-wound winding and an open star winding. The first converter is coupled to the open star winding and the second converter is coupled to the delta winding. The open star winding is configured for direct connection to either of a load or the open star winding of a second phase-shifted transformer, having a delta winding connected to a third converter. One or more DC voltage (Continued)

sources are each connected to the first and second converters by a respective DC link capacitor. Each DC voltage source is connected to a common power grid by an isolated multiphase transformer winding.

13 Claims, 6 Drawing Sheets

(51) Int. Cl.
  *H02M 7/5387* (2007.01)
  *H02M 5/14* (2006.01)
  *H02M 7/487* (2007.01)
  *H02M 7/497* (2007.01)
  *H02M 7/493* (2007.01)
  *H02M 1/00* (2006.01)

(52) U.S. Cl.
  CPC .... *H02M 7/493* (2013.01); *H02M 2001/0077* (2013.01); *Y10T 307/549* (2015.04)

(58) Field of Classification Search
  USPC ............... 307/52, 82, 83; 363/34, 64, 71
  See application file for complete search history.

(56) References Cited

U.S. PATENT DOCUMENTS

| | | | |
|---|---|---|---|
| 5,455,757 A | 10/1995 | Nguyen et al. | |
| 5,515,264 A | 5/1996 | Stacey | |
| 5,574,631 A | 11/1996 | Nelson et al. | |
| 5,905,642 A * | 5/1999 | Hammond ............... | H02M 1/12 363/37 |
| 5,936,855 A | 8/1999 | Salmon | |
| 6,169,674 B1 * | 1/2001 | Owen ..................... | H02M 5/10 336/10 |
| 6,335,872 B1 * | 1/2002 | Zhou ........................ | H02M 5/14 363/148 |
| 6,340,851 B1 * | 1/2002 | Rinaldi ................... | H01F 38/16 307/82 |
| 6,566,764 B2 | 5/2003 | Rebsdorf et al. | |
| 7,405,496 B2 | 7/2008 | Wagoner et al. | |
| 7,532,490 B2 | 5/2009 | Datta et al. | |
| 7,535,738 B2 * | 5/2009 | Wei ........................ | H02M 5/458 363/34 |
| 8,604,822 B2 | 12/2013 | Schroeder et al. | |
| 2008/0231241 A1 | 9/2008 | Lewis | |
| 2009/0045782 A1 | 2/2009 | Datta et al. | |
| 2009/0116268 A1 | 5/2009 | Kishida et al. | |

FOREIGN PATENT DOCUMENTS

| | | |
|---|---|---|
| CN | 101834532 A | 9/2010 |
| CN | 202153710 U | 2/2012 |
| CN | 102539957 A | 7/2012 |
| CN | 102568799 A | 7/2012 |

OTHER PUBLICATIONS

Liserre et al., "Step-by-step Design Procedure for a Grid-connected Three-phase PWM Voltage Source Converter", International Journal of Electronics, Aug. 2004, Volume No. 91, Issue No. 8, pp. 445-460.

Hefner et al., "Recent Advances in High-Voltage, High-Frequency Silicon-Carbide Power Devices", Industry Applications Conference, 2006, 41st IAS Annual Meeting, Conference Record of the 2006 IEEE, Oct. 8-12, 2006, vol. No. 1, pp. 330-337.

Wang, "Reduce Beat and Harmonics in Grid-Connected Three-Level Voltage-Source Converters With Low Switching Frequencies", IEEE Transactions on Industry Applications, Sep./Oct. 2007, Volume No. 43, Issue No. 5, pp. 1349-1359.

Hai, "High Voltage Regenerative Converter and the Control of its PWM Rectifier", 2010 International Conference on E-Product E-Service and E-Entertainment (ICEEE), Nov. 7-9, 2010, pp. 1-4.

Unofficial English translation of Chinese Office Action issued in connection with corresponding CN Application No. 201310081708.X on Dec. 21, 2015.

European Search Report issued in connection with EP Application No. 14159193.3 dated Jun. 6, 2014.

* cited by examiner

POWER CONVERSION SYSTEM AND METHOD

BACKGROUND

The subject matter of this disclosure relates generally power conversion systems and their use. In particular the subject matter of this invention relates to power converters, and to systems and methods for connecting high frequency-high voltage, transformer series connected converters between a power grid and a load.

Multilevel inverters have now become proven technology in medium and high voltage applications. They have the advantage of producing high voltage, high power capability with improved voltage quality. Multilevel inverters also eliminate the use of problematic series-parallel connections of switching devices.

Recent advances in power semiconductor technology results in development of fast switching devices such as IGBTs and MOSFETs. Such technology has enabled the use of high frequency switching modulation techniques in power inverters to reduce the harmonic content in output voltages. Switching frequency is increased to reduce the filtering requirement in almost all inverter topologies. The increased switching frequency, however, disadvantageously increases the switching losses, thus reducing the system efficiency. Since there are twelve switching devices in a three-level inverter, switching loss problems have become ever more significant. Inverters therefore suffer greater losses with increases in the number of inverter levels.

In view of the foregoing, there is a need for additional improvements in power conversion systems, especially those comprising high frequency-high voltage inverter/converters and which systems and methods reduce losses associated with high pulse wave modulation inverter frequencies.

BRIEF DESCRIPTION

In one embodiment, the present invention provides a power conversion system comprising: (a) a plurality of n converters, each of the n converters having a converter output voltage, n being an integer; (b) n−1 phase-shifted transformers comprising an open star winding and a delta winding, each of the n−1 phase-shifted transformers having a transformer electrical output, the n−1 phase-shifted transformers having a combined electrical output; wherein a first of the n converters is directly connected to the open star winding of a first of the n−1 phase-shifted transformers, and a second of the n converters is directly connected to the delta winding of the first of the n−1 phase-shifted transformers, and wherein the transformer electrical output of an $i^{th}$ phase-shifted transformer of the n−1 phase-shifted transformers is directed from the open star winding of the $i^{th}$ phase-shifted transformer via a direct electrical connection to either of a load, or an open star winding of an $i+1^{th}$ phase-shifted transformer of the n−1 phase-shifted transformers, the delta winding of the $i+1^{th}$ phase-shifted transformer being directly connected to an $i+2^{th}$ converter of the n converters, i being an integer in a range from 1 to n−1 inclusive, and wherein the combined electrical output of the n−1 phase-shifted transformers is configured for direct connection to a load through the open star winding of the $n-1^{th}$ phase-shifted transformer; (c) a controller configured to operate a plurality of switches of the one or more converters and thereby modulate the output voltages of one or more converters such that fundamentals of the output voltages are additive and such that one or more harmonic orders produced by modulation of the output voltages are eliminated or reduced at the combined electrical output of the n−1 phase-shifted transformers; and (d) one or more DC voltage sources configured to power the n converters.

In an alternate embodiment, the present invention provides a power conversion system comprising: (a) a first converter and a second converter, each converter having an output voltage during operation; (b) a phase-shifted transformer comprising a delta winding and an open star winding, the phase-shifted transformer having a combined electric output during operation; wherein the first converter is directly connected to the open star winding of the phase-shifted transformer, and the second converter is connected to the delta winding of the phase-shifted transformer, and wherein the combined electrical output of the phase-shifted transformer is configured for direct connection to a load through the open star winding of the phase-shifted transformer; (c) a controller configured to operate a plurality of switches of one or more of the converters and thereby modulate the output voltage of one or more of the converters such that fundamentals of the output voltages of the converters are additive and such that one or more harmonic orders produced by output voltage modulation are eliminated or reduced in the combined electrical output of the phase-shifted transformer; and (d) one or more DC voltage sources configured to power the converters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DRAWINGS

The foregoing and other features, aspects and advantages of the invention are apparent from the following detailed description taken in conjunction with the accompanying drawings in which like characters represent like parts throughout the drawings, wherein.

Figure 1:
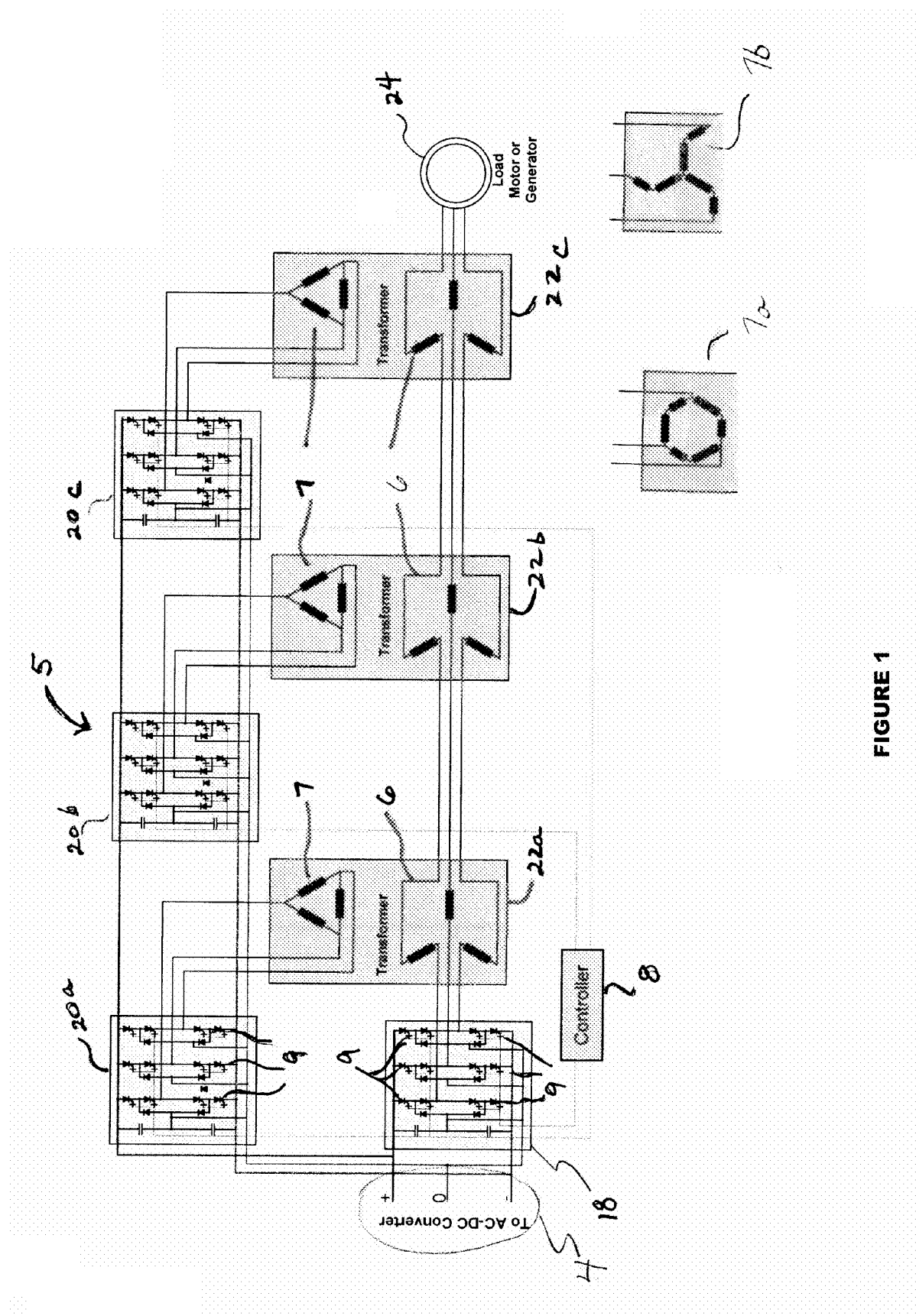
FIG. 1 illustrates a power conversion system 5 according to one or more embodiments of the present invention.

While the above-identified drawing figures set forth alternative embodiments, other embodiments of the present subject matter are also contemplated, as noted in the discussion. In all cases, this disclosure presents illustrated embodiments of the present subject matter by way of representation and not limitation. Numerous other modifications and embodiments can be devised by those skilled in the art which fall within the scope and spirit of the principles of this subject matter.

DETAILED DESCRIPTION

Reference now will be made in detail to embodiments of the subject matter, one or more examples of which are illustrated in the drawings. Each example is provided by way of explanation of the invention, not limitation of the subject matter. In fact, it will be apparent to those skilled in the art that various modifications and variations can be made in the present subject matter without departing from the scope or spirit of the subject matter. For instance, features illustrated or described as part of one embodiment can be used with another embodiment to yield a still further embodiment. Thus, it is intended that the present subject matter covers such modifications and variations as come within the scope of the appended claims and their equivalents.

As noted, the present invention provides a power conversion system comprising a plurality of n converters and n−1 phase-shifted transformers, wherein n is an integer greater than 1. In one or more embodiments of the power conversion system provided by the present invention n is an integer between 2 and 100 inclusive. The power conversion system comprises n−1 phase-shifted transformers connected to the converters in a particular configuration, as will be disclosed in detail herein, and which configuration enables important power conversion system performance enhancements featured by the power conversion systems provided by the present invention. In one or more embodiments, the power conversion system comprises a plurality of phase-shifted transformers. In one or more alternate embodiments the power conversion system comprises a single phase-shifted transformer and a pair of converters. In one or more embodiments, the power conversion system comprises from 2 to 10 converters and from 1 to 9 phase-shifted transformers.

The phase-shifted transformers provided by the present invention comprise an open star winding, or functionally equivalent winding, and a delta winding, or functionally equivalent winding. In the discussion which follows and throughout this disclosure, reference will be made to open star windings and delta windings as components of phase-shifted transformers useful in the practice of the invention, and these windings should be considered exemplary rather than limiting, and their substitution by functionally equivalent windings is contemplated by the present invention. The term open star winding may at times herein be referred to as an open Y winding, and the terms should be considered as having equivalent meanings. In one or more embodiments the present invention provides a power conversion system wherein at least one delta winding is configured as a polygon winding (See element 7a of FIG. 1). In one or more embodiments the present invention provides a power conversion system wherein at least one of the windings is configured as a zig-zag winding (See element 7b of FIG. 1). In one or more embodiments the present invention provides a power conversion system wherein, during operation, each phase-shifted transformer has a phase-shift of (60/n)° between the delta winding, or its functional equivalent, and the open star winding (or its functional equivalent), wherein n is the number of converters directly connected to the n−1 phase-shifted transformers.

Each of the n converters is configured to have a converter output voltage during operation, and the individual converter output voltages are directed to the phase-shifted transformers which sum the individual converter output voltages into a combined electrical output of the power conversion system which may be directly connected to a load, for example a motor. This combined electrical output of the power conversion system is at times herein referred to as the combined electrical output of the phase-shifted transformers.

The plurality of n converters are configured such that a first converter is directly connected to the open star winding of a first phase-shifted transformer, and during operation the converter output voltage of the first converter is applied directly to the open star winding of the first phase-shifted transformer. A second of the n converters is configured such that it is directly connected to the delta winding of the first phase-shifted transformer, and during operation the converter output voltage of the second converter is applied directly to the delta winding of the first phase-shifted transformer.

In embodiments wherein the power conversion system comprises a third converter, the third of the n converters is configured such that it is directly connected to the delta winding of a second phase-shifted transformer, and during operation the converter output voltage of the third converter is applied directly to the delta winding of the second phase-shifted transformer, and the first phase-shifted transformer and second phase-shifted transformer are configured such that the open star winding of the first phase-shifted transformer is directly connected the open star winding of the second phase-shifted transformer, and that during operation the transformer electrical output of the first phase-shifted transformer is directed to the open star winding of the second phase-shifted transformer, and that the combined electrical output of the first and second phase-shifted transformers is directed via a direct connection from the open star winding of the second phase-shifted transformer to either a load requiring electrical power or the open star winding of a third phase-shifted transformer.

In general then, the transformer electrical output of an $i^{th}$ phase-shifted transformer of the n−1 phase-shifted transformers is directed from the open star winding of the $i^{th}$ phase-shifted transformer via a direct electrical connection to either of a load, or an open star winding of an $i+1^{th}$ phase-shifted transformer of the n−1 phase-shifted transformers, the delta winding of the $i+1^{th}$ phase-shifted transformer being directly connected to an $i+2^{th}$ converter of the n converters, being an integer in a range from 1 to n−1 inclusive, and the combined electrical output of the n−1 phase-shifted transformers is configured for direct connection to a load through the open star winding of the $n-1^{th}$ phase-shifted transformer.

The power conversion systems provided by the present invention comprise at least one controller which is configured to operate a plurality of switches of one or more of the plurality of the n converters. During operation, the controller actuates the switches of the converter to modulate the output voltage of one or more converters such that fundamentals of the converter output voltages are additive, and such that one or more harmonic orders produced by modulation of the output voltages are eliminated or reduced at the combined electrical output of the n−1 phase-shifted transformers.

The power conversion systems provided by the present invention comprise one or more DC voltage sources to supply power to the n converters. In one or more embodiments each DC voltage source is connected to one or more converters by a DC link capacitor. The DC voltage source may itself be powered by an electrical grid. In one or more embodiments, each DC voltage source is connected to a power grid through an isolated multiphase transformer winding. In one embodiment, the present invention provides a power conversion system comprising at least one DC voltage source comprising a multiphase input diode bridge. In another embodiment, the present invention provides a power conversion system comprising at least one DC voltage source comprising a multiphase input SCR bridge. In yet another embodiment, the present invention provides a power conversion system comprising at least one DC voltage source comprising a multiphase input switching converter. In yet another embodiment, the present invention provides a power conversion system comprising at least one DC voltage source comprising a multiphase input switching converter, wherein the multiphase input switching converter comprises a three-level converter.

FIG. 1 is a schematic diagram illustrating a power conversion system 5 provided by the present invention and comprising a plurality (n) of converters 18/20a-c and a plurality (n−1) of phase-shifted transformers 22a, 22b and 22c. In the embodiment shown, n is equal to four (4) since the power conversion system 5 comprises a total of four converters, a first converter 18 directly connected to the open star winding 6 of the first phase-shifted transformer 22a, and three additional converters 20a, 20b and 20c directly connected to the delta windings of phase-shifted transformers 22a, 22b and 22c respectively. Each of the converters 18, 20a, 20b, and 20c has a converter output voltage during operation of the power conversion system 5. Similarly, during operation each of the phase-shifted transformers has a transformer electrical output, and the set of phase-shifted transformers 22a, 22b and 22c has a combined electrical output which is available to drive a load 24, which may be, for example, a motor. In the embodiment shown, the phase-shifted transformers are configured such that the combined electrical output of the phase-shifted transformers is directly connected to load 24 through the open star winding 6 of the third (the n−1$^{th}$) phase-shifted transformer 22c. Power conversion system 5 comprises a controller which is configured to operate a plurality of switches 9 in order to appropriately modulate the converter output voltages of each of converters 18 and 20a, 20b and 20c such that the combined electrical output of the phase-shifted transformers 22a-22c represents the an additive combination of the individual converter output voltages, and thus the combined electrical output of the phase-shifted transformers is characterized by a voltage which is the sum of the converter output voltages of the individual converters 18, 20a, 20b and 20c. In addition, the controller acts to eliminate or reduce one or more harmonic orders produced by modulation of the individual converter output voltages. In the embodiment shown, a link 4 to a DC voltage source (not shown) is connected to each of converters 18, 20a, 20b and 20c.

For purposes of simplicity, the embodiments of the present invention shown in FIGS. 2-6 comprise a single phase-shifted transformer. Nonetheless, the power conversion systems shown in FIGS. 2-6 illustrate inventive features and operational modes common to the various embodiments of the present invention comprising a plurality of phase-shifted transformers as well.

Figure 2:
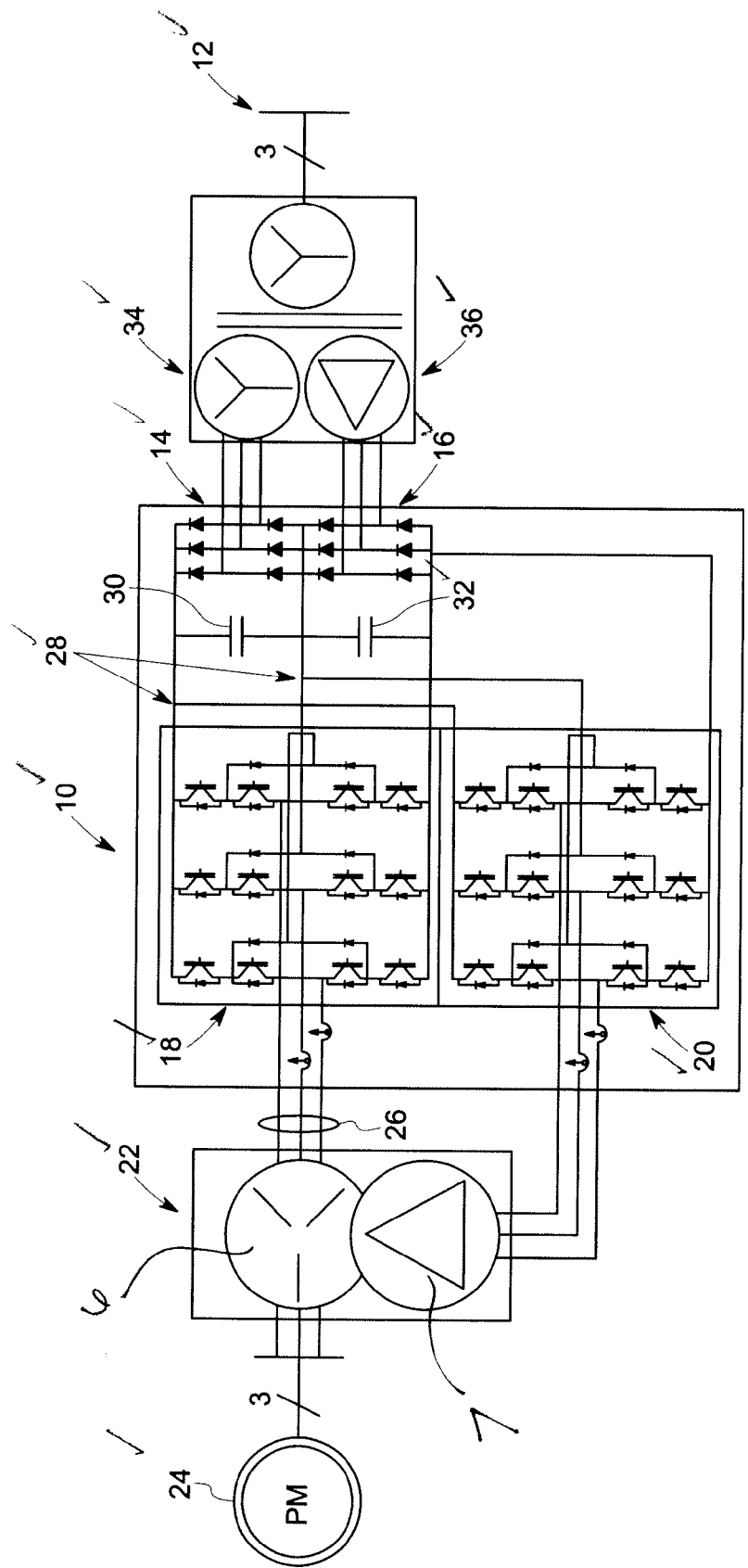
FIG. 2 illustrates a power conversion system 10 according to one or more embodiments of the present invention.

FIG. 2 is a schematic diagram illustrating a power conversion system 10 comprising high frequency-high voltage converters 18 and 20 connected to a power grid 12 via a pair of three-phase diode bridges/converters 14, 16 according to one embodiment of the present invention. Power conversion system 10 comprises a pair of converters 18, 20 effectively connected in series through an open Y-Delta transformer 22 to a multiphase load 24. This configuration advantageously allows feeding a three-phase load 24 with a very high quality voltage and high frequency fundamental, while keeping the losses in the power conversion system 10 to a minimum by reducing the required pulse-width modulation (PWM) frequency. It also allows the use of converters having a fractional (V/n) load voltage rating by adding converter output voltages through the transformer 22 (or n−1 such phase-shifted transformers) to form the three-phase output voltage. Power conversion system embodiments disclosed herein may be used to operate at fundamental frequencies in the range extending up to at least 300 Hertz. In a more specific embodiment, the fundamental frequency range extends up to at least 400 Hertz. In an even more specific embodiment, the fundamental frequency range extends up to at least 600 Hertz. The resulting waveform from the addition of the voltages of converters 18 and 20 through the delta-star transformer connection is expected to have reduced harmonic distortion (particularly on the 5$^{th}$ and 7$^{th}$ order harmonics) and thus improved power quality as compared with a straight addition of the voltages without the delta-star configuration of transformer 22. Transformer 22 is selected to operate at frequencies needed to run the multiphase load 24.

Model studies were carried out which simulated the line-to-line voltages of converters 18 and 22 in a power conversion system such as 10. The model studies in this instance illustrated the use of three level converters to generate five line-to-line voltage levels. By applying the appropriate phase shifts via the output transformer 22 configuration and appropriate switching of the converters using on-line harmonic elimination the voltage curves at the machine terminals are expected to be even smoother than the curves taken directly from the converters.

Model studies were carried out using several different switching patterns, and the combined effect of switching frequency and fundamental frequency on the combined electrical output of the power conversion system was evaluated. In a first switching pattern (1×) every switch of the converters is switched on and off once per fundamental cycle. In an alternate switching pattered modeled by the inventors, N pulses were applied on each positive half of the fundamental cycle, and N pulses were applied on each negative half of the fundamental cycle. By adjusting the lengths of the pulses, the waveforms were modulated, the result being a demonstration that switching patterns varying with respect to the fundamental frequency of the power may be employed according to one or more embodiments of the present invention.

When converters were switched with synchronous switching patterns and low pulse count, to avoid reducing output power quality, the switching frequency of the active switches may be limited to the fundamental frequency at the highest machine speed. When designing converters for high power applications, the switch frequencies may be limited due to the switch ratings typically being several hundred amperes of current and several kilovolts of blocking voltage. Typically such switch frequencies are less than about one kHz and more specifically in the range of 500 Hz to 800 Hz.

Art recognized modulation techniques include synchronous pulse width modulation (PWM) and asynchronous modulation. When synchronous PWM is used, switching instances are synchronized to the fundamental frequency and the line-to-line voltage waveforms of the combined electrical output of the power conversion system is characterized by waveforms having quarter-wave and half-wave symmetry.

When asynchronous modulation is used, the switching events are not synchronized to the fundamental frequency. The switching events for asynchronous modulation may be determined in one embodiment by comparing the fundamental frequency voltage command waveforms to one or more fixed frequency carrier waveforms. The frequency of the carrier waveform is selected to be at least one order of magnitude higher than the fundamental frequency to obtain desired power quality of the converter output voltages. Practically, the carrier frequency is limited by the maximum switching frequency of the semiconductor switches. Hence, asynchronous modulation methods provide low harmonic distortion at low fundamental frequencies. However, the harmonic distortion increases with increases in the fundamental frequency, and the power quality may not be acceptable at high fundamental frequencies.

As noted, the switching frequency of the converter switches may be varied in relation to the fundamental frequency. In one embodiment, the modulation is designed such that at the highest fundamental frequency, the switching frequency of each switching device is the same as the fundamental frequency, thereby ensuring that the switching devices operate within their thermal capabilities. This mode of switching is referred to as 1× mode. However, as the fundamental frequency is reduced, it may possible to switch each switching device at 2 to 3 times the fundamental frequency in modulation protocols referred to as 2× mode and 3× mode respectively. The switching patterns may be varied as a function of the fundamental frequency to minimize the number of switching events per fundamental cycle. In one protocol synchronous modulation is used between 150 Hertz and 600 Hertz, while at start-up (between zero Hertz and 150 Hertz) asynchronous modulation with fixed switching frequency is used.

Various switching patterns may be used in order to achieve high power quality at the load over the entire operating speed range. For switching patterns used in synchronous modulation, the switching angles at which the switching events take place may be calculated off-line or during the converter operation to reduce output harmonic distortion. The placement of the pulses, in combination with the phase shift introduced through the phase-shifted transformer work together in eliminating certain harmonics of the output voltage which would be present in the absence of such treatment. In one embodiment, the switching angles in the different patterns for reduced harmonic distortion are calculated off-line and stored in a static look-up table. During operation of the power conversion system, the information about the instantaneous switching state is retrieved from the look up table depending on the modulation index and the phase angle.

Referring again to FIG. 2, the figure represents the converters 18 and 20 as multilevel three phase bridges and having three-phase output terminals 26 and two or more input terminals 28 where the converters 18 and 20 receive a DC voltage. Although FIG. 2 depicts a pair of three level converters 18 and 20, the principles described herein may apply equally well to converters of any numbers of levels at their outputs.

The two DC voltages required by the pair of converters 18 and 20 in the simple, non-regenerative configuration depicted in FIG. 2 come from the pair of three phase diode bridges 14 and 16. Each diode bridge 14, 16 is connected to a respective capacitor 30, 32 that functions as a filter for high frequency harmonics and as storage for transients coming from the grid 12 through electrical link 3. Configured as shown in FIG. 2, capacitors 30 and 32 eliminate the need for additional voltage or current control of the multilevel converters 18, 20 to ensure that the voltage of the middle terminal is at the center of the voltage between the two outer terminals of the DC link. The diode bridges 14, 16 have their inputs connected to two sets of isolated three phase windings 34, 36 that may come from one or two three phase transformers. Those of ordinary skill in the art will appreciate that if the primary winding of the grid side transformer(s) is fed by the same set of terminals, the transformer secondary windings may connected in Y and Delta configurations to eliminate the fifth and seventh harmonics in the grid supplied currents.

Figure 3:
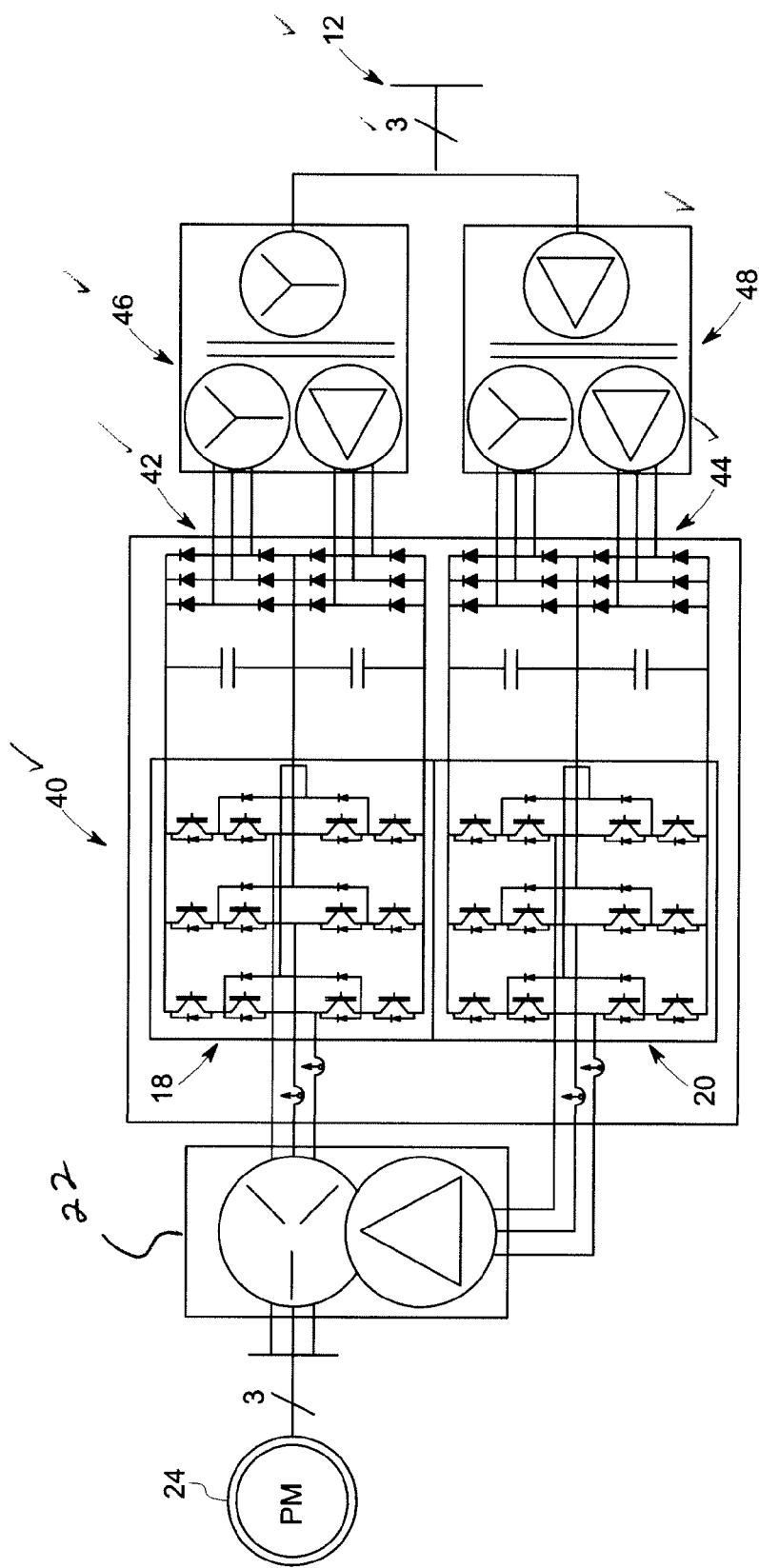
FIG. 3 illustrates a power conversion system 40 according to one or more embodiments of the present invention.

Referring to FIG. 3, the figure represents a high frequency-high voltage, transformer series connected power conversion system 40 comprising a pair of converters 18 and 20 directly connected to the open star winding 6 and delta winding 7 of a phase-shifted transformer 22 which in turn is connected to load 24 via electrical link 3. In the embodiment shown, the power conversion system 40 is connected to a power grid 12 via separate sets of three-phase diode bridges 42 and 44. Each of diode bridge 42 and 44 applies DC power to a respective converter 18 and 20.

The diode bridges 42 and 44 may be connected to the grid 12 via one or two separate transformers 46 and 48. The single transformer configuration is commonly referred to as a 12-pulse configuration.

The primary of one grid side transformer may be connected in Y while the primary of the other grid side transformer may be connected in Delta when two separate transformers are connected such as depicted in FIG. 3. This configuration allows the elimination of even higher order harmonics, and is commonly referred to as a 24-pulse configuration. The 24-pulse configuration fulfills the requisite harmonics requirements of the grid 12 such as IEEE-519 with a minimum of or no additional filtering required at the grid side in most applications.

A configuration with substantially the same output quality may also be achieved by feeding each half of the DC voltage with a pair of three phase diode bridges of half the voltage. The DC connection in this configuration feeds both of converters 18 and 20. The foregoing configurations may be used where the drive does not require the capability to feed power from the load side back to the grid 12.

Figure 4:
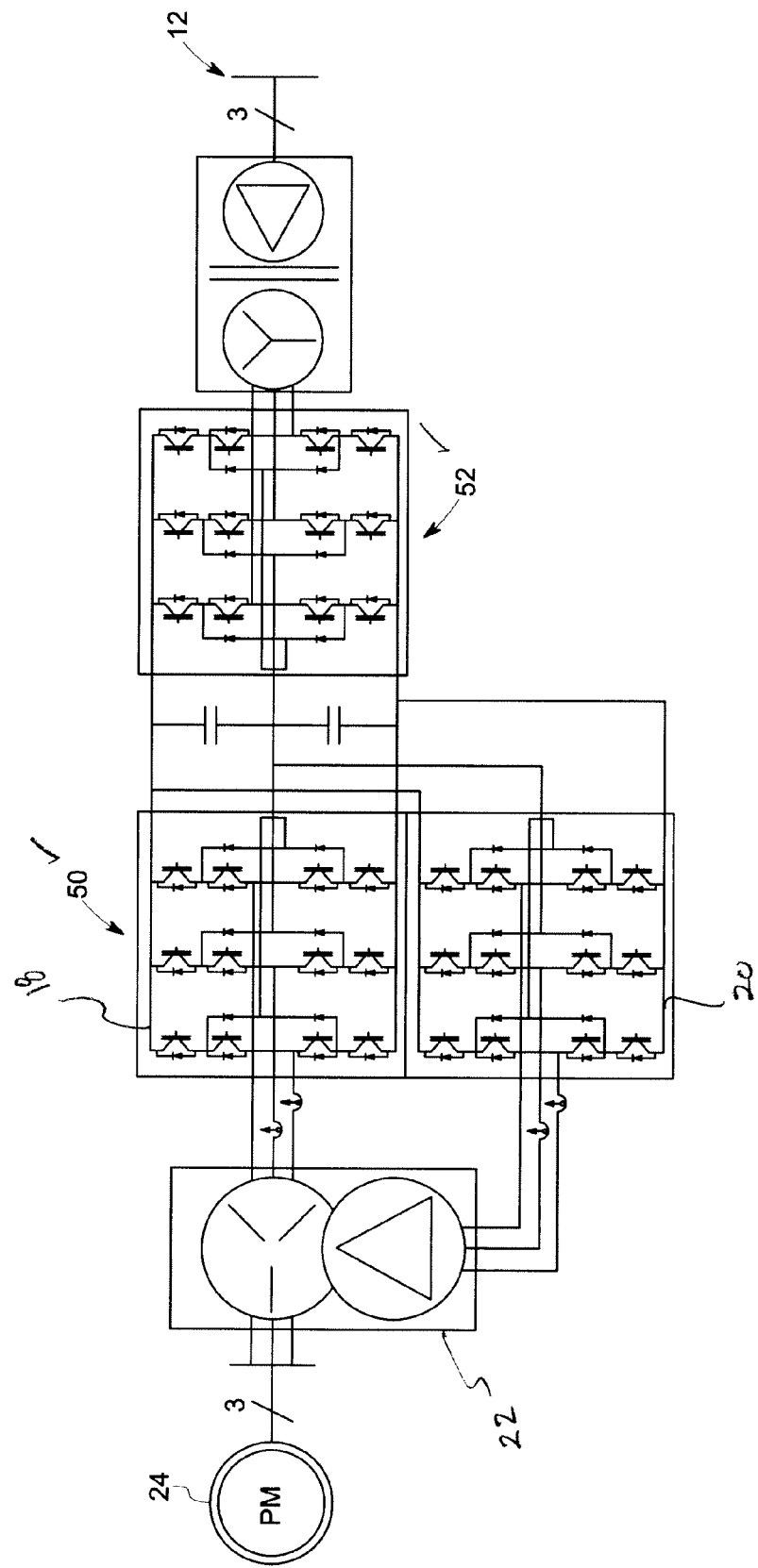
FIG. 4 illustrates a power conversion system 50 according to one or more embodiments of the present invention.

Referring to FIG. 4, the figure represents a power conversion system 50 comprising a pair of converters 18 and 20 attached to a phase-shifted transformer 22 the output of which is directed via a direct connection 3 to a load 24. Power conversion system 50 is powered by grid 12 via a single three-level switching converter 52 according to yet another embodiment of the present subject matter. It will be appreciated by those of ordinary skill in the art that while converter 52 is present in the power conversion system 50, it does not count toward the total of n converters, since to qualify as being be counted among the n converters, a converter must be directly connected an open star winding (or an equivalent winding such as a zig-zag winding) of a phase-shifted transformer 22, or be directly connected to a delta winding (or an equivalent winding such as a polygon winding) of a phase-shifted transformer 22. In the embodiment shown, the single three-level switching converter 52 operates with sufficient power to feed the power conversion system 50. Further, the single three-level switching converter 52 may be sized with free-wheeling diodes of higher rating than the switching devices if the amount of regeneration is less than the power required to feed from the grid 12 to the load 24.

Figure 5:
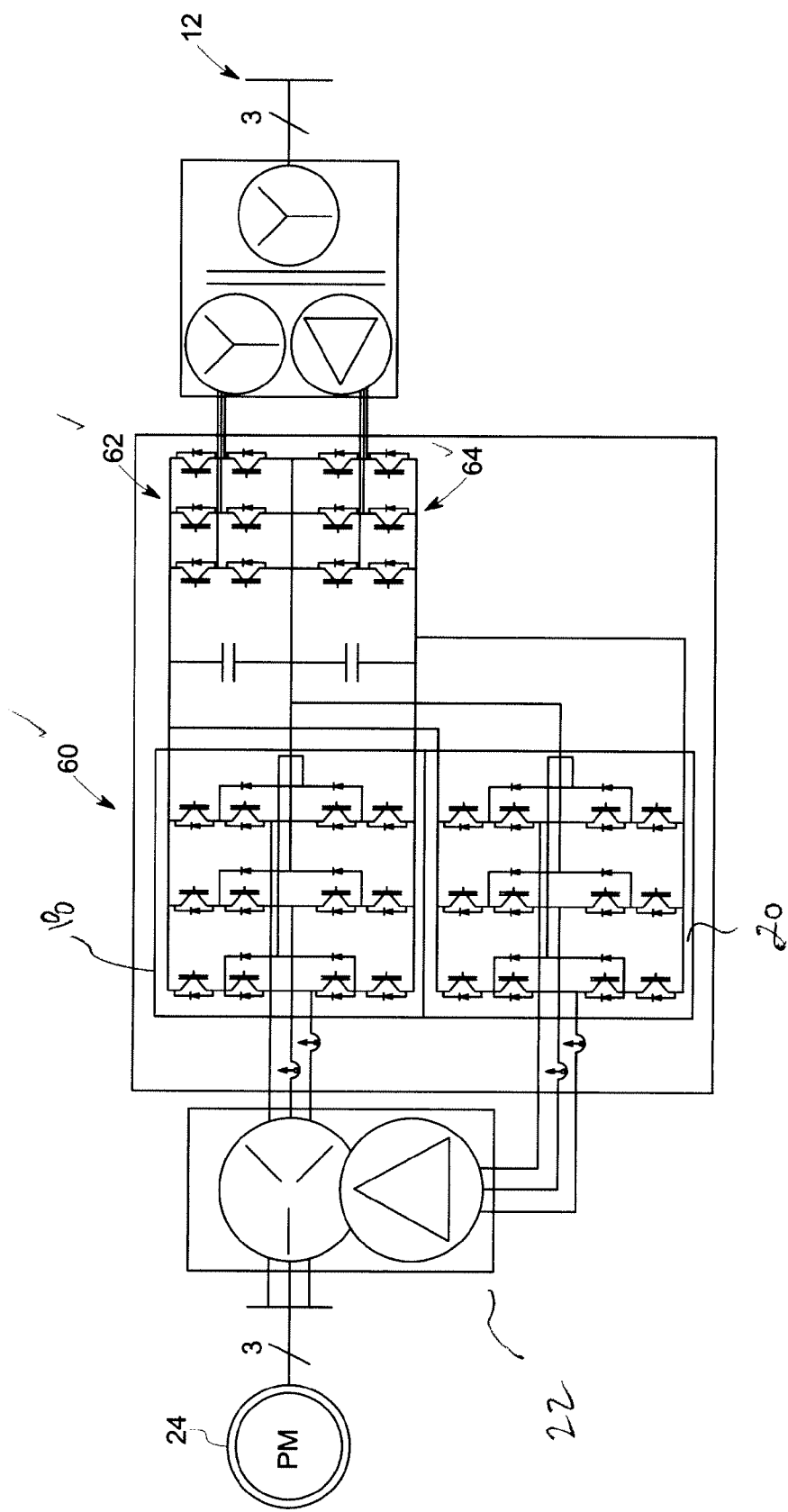
FIG. 5 illustrates a power conversion system 60 according to one or more embodiments of the present invention.

Referring to FIG. 5, the figure represents a power conversion system 60 provided by the present invention which may be connected to a power grid 12 via a pair of two-level switching converters 62 and 64. The two-level switching converters 62 and 64 may replace the two diode bridges 14 and 16 depicted in FIG. 2. Similar to the converter 50 topology shown in FIG. 4, the rating of the switches does not necessarily have to be identical with that of the free-wheeling diodes.

Figure 6:
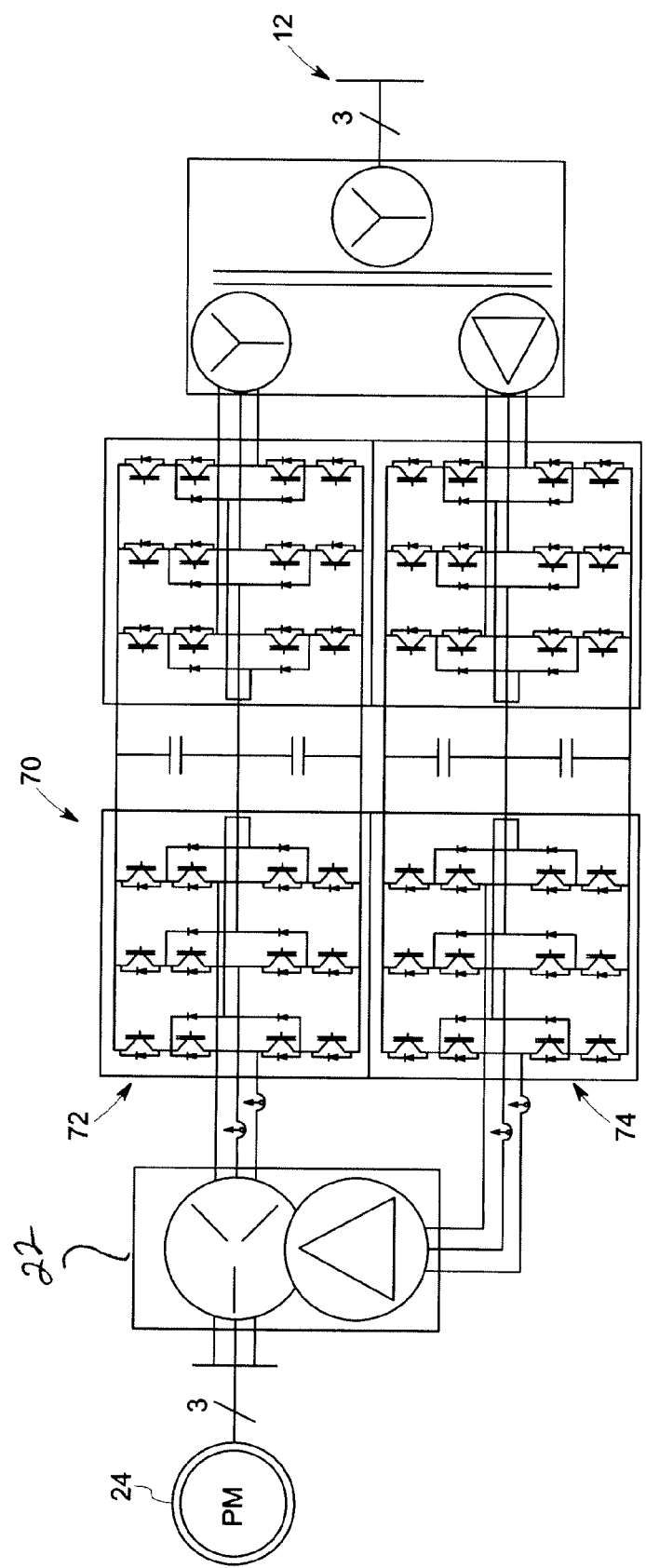
FIG. 6 illustrates a power conversion system 70 according to one or more embodiments of the present invention.

Referring to FIG. 6, the figure represents a power conversion system 70 provided by the present invention connected to a power grid 12 and a load 24. Power conversion system 70 comprises two full regenerative (back-to-back) converters 72 and 74 that are combined to form the high frequency series topology.

In various embodiments of the present invention, power conversion systems having active devices at the grid side may have the capability to eliminate harmonics and operate at unity power factor or even, if they have sufficient power capability, to feed reactive power to the grid 12 when needed. In one or more embodiments the power conversion systems described herein may further be used to feed active and reactive power to the grid 12 using a turbine as a prime mover when the load is an electric machine used to operate a turbine or to drive a compressor.

In one or more embodiments, SCR bridges may be employed in place of the switching devices in the regenerative configurations illustrated in FIGS. 4-6. The use of SCR bridges however, may add unwanted harmonics to the output and may not be able to operate with unity power factor. Further, the additional filter required may eliminate or reduce any cost advantage of a configuration that employs SCR bridges in place of the switching devices.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power conversion system, comprising:
   n converters, each of the n converters having a converter output voltage, n being an integer greater than or equal to four;
   n−1 phase-shifted transformers, each of the n−1 phase-shifted transformers comprising an open star winding and a delta winding, and each of the n−1 phase-shifted transformers having a transformer electrical output, the n−1 phase-shifted transformers having a combined electrical output,
   wherein a first of the n converters is directly connected to the open star winding of a first of the n−1 phase-shifted transformers, and a second of the n converters is directly connected to the delta winding of the first of the n−1 phase-shifted transformers,
   wherein the transformer electrical output of an $i^{th}$ phase-shifted transformer of the n−1 phase-shifted transformers is directed from the open star winding of the $i^{th}$ phase-shifted transformer via a direct electrical connection to either of a load, or an open star winding of an $i+1^{th}$ phase-shifted transformer of the n−1 phase-shifted transformers, the delta winding of the $i+1^{th}$ phase-shifted transformer being directly connected to an $i+2^{th}$ converter of the n converters, i being an integer in a range from 1 to n−1 inclusive, and
   wherein the combined electrical output of the n−1 phase-shifted transformers is configured for direct connection to a load through the open star winding of the n−$1^{th}$ phase-shifted transformer;
   a controller configured to operate a plurality of switches of one or more converters of the n converters and thereby modulate the converter output voltages of the one or more converters such that fundamentals of the output voltages are additive and such that one or more harmonic orders produced by the modulation of the converter output voltages are eliminated or reduced at the combined electrical output of the n−1 phase-shifted transformers; and
   one or more DC voltage sources configured to power the n converters.

2. The power conversion system according to claim 1, wherein each of the DC voltage sources is connected to the one or more converters by a DC link capacitor.

3. The power conversion system according to claim 1, wherein each of the DC voltage sources is connected to a power grid through an isolated multiphase transformer winding.

4. The power conversion system according to claim 1, further comprising a plurality of phase-shifted transformers.

5. The power conversion system according to claim 1, wherein each of the n converters are essentially identical.

6. The power conversion system according to claim 1, wherein during operation each of the n−1 phase-shifted transformers has a phase-shift of (60/n)° between the delta winding and the open star winding.

7. The power conversion system according to claim 1, wherein one or more of the n converters comprises two or more level-three phase bridges.

8. The power conversion system according to claim 1, wherein at least one of the DC voltage sources comprises a multiphase input diode bridge.

9. The power conversion system according to claim 1, wherein the power conversion system is configured to connect to a power grid by an isolated Y winding of a first grid side transformer.

10. The power conversion system according to claim 1, wherein the power conversion system is configured to connect to a power grid by an isolated delta winding of a grid side transformer.

11. The power converter according to claim 1, wherein at least one of the DC voltage sources comprises a multiphase input silicon-controlled rectifier (SCR) bridge.

12. The power conversion system according to claim 1, wherein at least one of the DC voltage sources comprises a multiphase input switching converter.

13. The power conversion system according to claim 1, wherein at least one of the DC voltage sources comprises a multiphase input switching converter, the multiphase input switching converter comprising a three-level converter.

* * * * *